Patented Apr. 13, 1937

2,076,795

UNITED STATES PATENT OFFICE 2,076,795

RESIN

George W. Seymour, Cumberland, Md., assignor to Celanese Corporation of America, a corporation of Delaware No Drawing. Application July 12, 1933, Serial No. 680,081

3 Claims. (Cl. 260—2)

This invention relates to the preparation of a resin from carbohydrates, and also to coating or plastic compositions containing derivatives of cellulose and particularly organic derivatives of cellulose.

An object of my invention is to prepare a resin that is compatible with derivatives of cellulose, and therefore suitable for use in films, lacquers or other coating compositions or plastics containing such derivatives of cellulose.

A further object of my invention is to provide a suitable resin for lacquers or plastic compositions containing derivatives of cellulose, which resin is compatible with the other constituents of the lacquers and which produces clear solutions which upon drying form films that are adherent, tough and hard, and fast to light.

The preparation of a lacquer containing organic derivatives of cellulose such as cellulose acetate as the main constituent of the lacquer base, which lacquer is to be applied to a hard, smooth surface presents many difficulties. This is due primarily to the fact that films from lacquers containing cellulose acetate as the sole constituent of the lacquer base do not adhere to smooth surfaces. When attempts are made to incorporate natural gums or resins in the lacquer containing cellulose acetate in order to impart the necessary adhesive qualities to the film produced from it, both the lacquer and the film produced therefrom become cloudy and unhomogeneous.

I have found that synthetic resins produced by the polymerization of carbohydrates by heating in the presence of an acid are compatible with cellulose acetate, and that when added to lacquers containing cellulose acetate they form clear solutions that upon drying produce clear, hard and tough and firmly adherent films, which are substantially fast to light.

In accordance with my invention, I prepare special resins formed by heating a carbohydrate in the presence of an acid, and preferably in the presence of an aqueous solution of a mineral acid such as hydrochloric acid or sulfuric acid. These synthetic resins are then used for making a lacquer or plastic composition which contains one or more derivatives of cellulose and a volatile solvent. The lacquer may contain also one or more natural or semi-synthetic resins or gums, one or more plasticizers or softening agents, medium and/or high boiling point solvents and preferably, but not necessarily, some pigments and/or dyes.

Solutions thus formed may be employed as a lacquer or composition for metal, glass or other surfaces and may be used for making photographic or other films. Artificial yarns may be formed by extruding the solution containing the derivative of cellulose and the special resin through the orifices of a spinneret, either into a heated evaporative atmosphere as in dry spinning, or into a precipitating bath as in wet spinning. The solution may also be employed as an adhesive, and is particularly useful in this connection for making shatterless glass by causing celluloid sheets to adhere to surfaces of sheets of glass between which they are placed.

The plastic composition containing derivatives of cellulose and the special resin may be worked into sheets which may also be used for laminated glass, and also may be worked into blocks or articles in any known manner.

Molding compositions may be made by intimately mixing the organic derivative of cellulose with the special resin with or without plasticizer, and these compositions may be molded under heat and pressure to form any articles of desired shape.

The derivative of cellulose that may be used for making the solutions for coating or plastic compositions comprises any suitable derivative, such as cellulose nitrate or organic derivatives of cellulose. Examples of organic derivatives of cellulose are organic esters of cellulose such as cellulose acetate, cellulose formate, cellulose propionate and cellulose butyrate or cellulose ethers such as ethyl cellulose, methyl cellulose and benzyl cellulose.

The low boiling point solvent that may be employed may be one or a mixture of two or more of the following: acetone, ethylene formal, alcohol, benzene or ethylene dichloride. Examples of medium and/or high boiling point solvents are ethyl acetate, ethyl lactate, formal glycerol, tetrachlorethane, benzyl alcohol or diacetone alcohol. Of course it is understood that the choice of the solvents depends on the solubility characteristics of the particular derivative of cellulose employed. Examples of suitable plasticizers are diphenylol propane, triacetin, dibutyl tartrate, diethyl phthalate, dimethyl phthalate, ethyl toluene sulfonamid, and mono methyl xylene sulfonamid. If desired, fire retardants may be added, particularly the very effective bromine derivatives of organic compounds, such as brominated tricresyl phosphate. The pigments or dyes that may be used may be those ordinarily employed in the paint or lacquer industry.

Of the natural gums or resins that may be added, the following may be mentioned: manila, acaroides, pontianak, kauri, dammar, rosin and shellac. The semi-synthetic resin, ester gum, which is the glycerol ester of rosin may be also added. If desired, synthetic resins, other than the special resin formed by the polymerization of carbohydrates may be employed in conjunction therewith, and examples of these are the fusible and soluble phenol-formaldehyde or diphenylol propane-formaldehyde resins preferably prepared in the presence of acid catalysts.

To form the resin, a carbohydrate is heated with an aqueous or other solution of an acid such as hydrochloric or sulfuric acid at temperatures up to the boiling point of the solution or even above the use of superatmospheric pressure. A black humus-like mass separates out slowly. This humus-like material is separated from the liquor, and washed with water until it is free of water-soluble substances. The resin is then extracted from the humus-like material by means of acetone or other solvent for the resin.

Any suitable carbohydrate may be employed for making the resin. Examples of such carbohydrates are polysaccharides, such as cellulose or its near conversion products, starch, dextrin, glycogen or indulin, and sugars such as glucose, lactose or saccharose (cane sugar).

In order further to explain my invention but without being limited thereto, the following example is given of one mode of carrying out my invention.

1,000 liters of an aqueous solution of hydrochloric acid of about 20% strength is heated to the boiling point and thereupon 500 kg. of glucose or cane sugar are gradually added with stirring. After the addition of all the sugar, the mass is maintained at boiling temperature for a further two hours. The humus-like mass separates out, and after cooling, is filtered off and washed with water until free of water soluble material after which it is dried. This mass is then extracted with acetone which dissolves the resin, and the resin may then be separated from its acetone solution by evaporation of the acetone.

The resin so formed is dark brown in color and tends to bleach slightly when exposed for more than 100 hours in the fadeometer.

The following examples serve to illustrate coating or plastic compositions made in accordance with this invention.

Example I

A coating composition containing the resin may be made as follows:

| | Parts by weight |
|---|---|
| Cellulose acetate | 10 |
| Synethetic resin | 1 to 20 |
| Diethyl phthalate | 3 |
| Acetone | 100 |

Example II

The following is another example of coating composition:

| | Parts by weight |
|---|---|
| Cellulose acetate | 10 |
| Synthetic resin | 1 to 20 |
| Ethyl toluene sulfonamid | 4 |
| Acetone | 50 |
| Benzene | 25 |
| Alcohol (ethyl or denatured) | 25 |
| Diacetone alcohol | 20 |

Example III

The following is an example of a solution that is suitable as an adhesive, and is particularly useful for causing a sheet of celluloid to adhere to surfaces of sheets of glass, cardboard, asbestos, metal, etc.

| | Parts by weight |
|---|---|
| Cellulose acetate | 20 |
| Synthetic resin | 25 |
| Acetone | 60 |
| Ethyl acetate | 30 |
| Ethyl lactate | 10 |

Example IV

The following is an example of a plastic composition:

| | Parts by weight |
|---|---|
| Cellulose acetate | 100 |
| Synthetic resin | 40 |
| Monomethyl xylene sulfonamid | 10 |
| Alcohol | 50 |
| Benzene | 50 |

Example V

The following is an example that may be employed for making artificial yarn by extruding through the orifices of a spinneret into a heated, evaporative atmosphere:

| | Parts by weight |
|---|---|
| Cellulose acetate | 100 |
| Synthetic resin | 20 |
| Acetone | 400 |

Example VI

The following is a formula for pigmented lacquer:

| | Parts by weight |
|---|---|
| Cellulose acetate | 20 |
| Synthetic resin | 25 |
| Diphenylol propane | 10 |
| Pigment | 10 |
| Acetone | 100 |
| Ethyl acetate | 20 |
| Benzene | 20 |
| Toluene | 10 |
| Ethyl lactate | 20 |

Example VII

The following examples are given to illustrate the use of a synthetic resin in connection with cellulose nitrate for various purposes: (a) Coating composition may contain:

| | | |
|---|---|---|
| Cellulose nitrate | kilograms | 6 |
| Camphor | do | 2 |
| Diethyl phthalate | do | 2 |
| Synthetic resin | do | 10 |
| Benzene | liters | 20 |
| Alcohol | do | 20 |
| Butyl alcohol | do | 20 |
| Butyl acetate | do | 20 |
| Ethyl acetate | do | 30 |

(b) An adhesive solution suitable for use in the preparation of laminated glass may contain:

| | | |
|---|---|---|
| Cellulose nitrate | kilogram | 0.4 |
| Camphor | do | 0.1 |
| Dibutyl phthalate | do | 0.1 |
| Synthetic resin | do | 1.0 |
| Benzene | liters | 20 |
| Alcohol | do | 10 |
| Butyl alcohol | do | 20 |
| Butyl acetate | do | 20 |
| Ethyl acetate | do | 30 |

In the foregoing examples, the cellulose acetate may be replaced by cellulose propionate, cellulose butyrate, etc. Either the cellulose acetate or the cellulose nitrate may be replaced by cellulose ethers.

It is to be understood that the foregoing detailed description is given merely by way of illustration, and that many variations may be made therein, without departing from the spirit of my invention.

Having described my invention, what I claim and desire to secure by Letters Patent is:

1. Method of preparing a resin comprising polymerizing a sugar by heating the same in the presence of an aqueous solution of a mineral acid under such conditions that a resin soluble in acetone is formed.

2. Method of preparing a resin comprising polymerizing a sugar by heating the same in the presence of an aqueous solution of a mineral acid under such conditions that a resin soluble in acetone is formed, separating the precipitated mass from the liquor, and extracting the resin from said mass by means of a solvent for the resin.

3. A resin soluble in acetone and formed by the heating of a sugar in the presence of an aqueous solution of a mineral acid.

GEORGE W. SEYMOUR.